Jan. 24, 1950  M. FRIEDMAN  2,495,247
TERMINAL CONSTRUCTION FOR PRIMARY CELLS
Filed Oct. 29, 1947
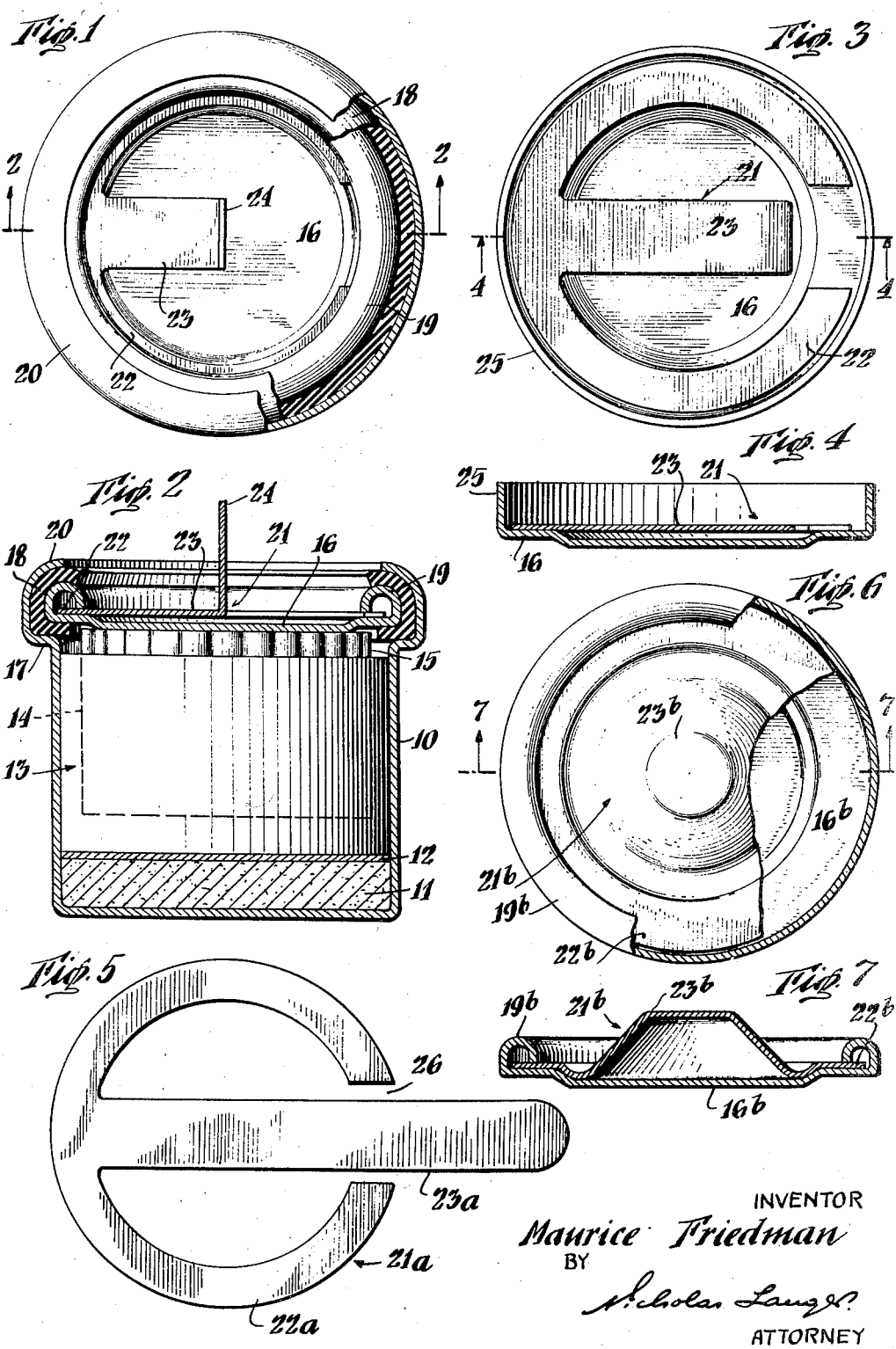
INVENTOR
Maurice Friedman
BY
Nicholas Langer
ATTORNEY Patented Jan. 24, 1950

2,495,247

UNITED STATES PATENT OFFICE 2,495,247

TERMINAL CONSTRUCTION FOR PRIMARY CELLS

Maurice Friedman, Ossining, N. Y., assignor to P. R. Mallory & Co., Inc., Indianapolis, Ind., a corporation of Delaware Application October 29, 1947, Serial No. 782,758

9 Claims. (Cl. 136—135)

1

This invention relates to terminal constructions for primary cells, and, more particularly, to a terminal construction of novel and improved character suitable for use in combination with alkaline dry cells.

In U. S. Patent No. 2,422,045, to Samuel Ruben, relating to an Alkaline dry cell, there is disclosed a sealed alkaline primary cell comprising an amalgamated zinc anode, a cathode formed of a conductive body containing an electrolytically reducible oxygen-yielding compound (such as mercuric oxide), and an immobilized electrolyte comprising an aqueous solution of an alkali metal hydroxide (such as potassium hydroxide) containing a substantial quantity of alkali metal zincate. The presence of the zincate in the electrolyte, in combination with other features described in the said patent, prevents or strongly inhibits any tendency for a chemical hydrogen-generating reaction to take place between the electrolyte and the zinc anode when the cell is stored prior to use, as well as during active use. These factors have made possible a sealed alkaline dry cell which does not generate gas or leak electrolyte during shelf life or when in use.

The aforesaid Ruben patent discloses various cell constructions which essentially comprise a container or can of relatively inert metal, such as steel, a metal top disc or cover plate for the can, and an insulative gasket compressed between cooperating portions of the said can and plate and constituting therewith a generally air-tight enclosure for the cell. The inner surfaces of can and coverplate are in electrical contact with electrodes of opposite polarity disposed within the cell enclosure while their external surfaces can be utilized as cell terminals engageable by electrical conductors for connecting the cell into an electrical circuit.

Heretofore, for connecting cells of the described character into an electrical circuit or for connecting such cells in parallel or series relation with other cells of similar character, it was customary to secure a terminal tab to the top surface of the top disc or cover plate by soldering. This operation was relatively expensive when manufacturing cells on a quantity production scale. Also, there was a possibility of the soldered joint coming loose, particularly when the tab was overheated upon being connected by another soldering operation to a lead wire or to the tab of another similar cell. This caused manufacturing difficulties and necessitated great care and accurate control of the soldering operation resulting in loss of time and increased cost in assembling batteries for cells of the described character.

I have now discovered that the outstanding problem may be solved in a simple and fully satisfactory manner.

2

It is an object of the present invention to provide a terminal construction for primary cells which eliminates the difficulties experienced with prior terminal arrangements.

It is another object of the present invention to provide a novel and improved terminal construction for primary cells, which is particularly adaptable to alkaline dry cells of the type mentioned in the above patent.

It is a further object of the invention to provide a terminal construction for primary cells in which a terminal tab is secured to the top disc of the cell by mechanically interlocking certain of its portions with portions of the top disc in the absence of soldering operations.

The invention also contemplates a terminal organization for primary cells which is simple in construction, reliable in its operation and which may be readily utilized in the manufacture of primary cells on a practical and commercial scale at a low cost.

Other and further objects and advantages of the present invention will become apparent from the following description, taken in conjunction with the accompanying drawing, in which Fig. 1 is a top elevational view, having parts broken away for reasons of clarity, of a primary cell embodying the principles of the present invention;

Fig. 2 is a vertical sectional view taken on line 2—2 of Fig. 1;

Fig. 3 is a top elevational view showing the top disc and terminal member of the cell prior to their final assembly;

Fig. 4 is a vertical sectional view taken on line 4—4 of Fig. 3;

Fig. 5 is a plan view of a modified terminal member;

Fig. 6 is a top elevational view, having parts broken away and parts in section for clarity of illustration, of a cell top disc and interlocked terminal member of modified construction; and Fig. 7 is a vertical section taken on line 7—7 of Fig. 6.

Referring to the drawing, Figures 1 and 2 illustrate one embodiment of the invention as applied to an airtight dry cell of the alkaline dry type. The cell comprises a cup or container 10 of relatively inert metal, such as steel, in the bottom of which is pressed a cathode 11 of the depolarizing material comprising an electronically-conductive coherent compressed mass including an electrolytically reducible oxygen-yielding compound of a metal, such as an oxide of silver or mercury. The cathode is covered by a minutely porous and ionically permeable barrier disc 12 comprising part of the spacing means between the anode and cathode, the barrier disc being permeable to electrolyte but substantially limiting or preventing travel of deleterious materials from one electrode to the other.

An anode assembly 13 is pressed against the top face of barrier 12 and comprises a roll of amalgamated zinc foil 14 interwound with a strip of porous electrolyte-retaining sheet spacing material, such as filter paper, held in an insulating sleeve of non-porous material, such as polystyrene. An edge 15 of the zinc foil 14 projects at the top of the roll, likewise an edge of the spacing material projects at the bottom of the roll and into contact with the barrier disc 12, thereby providing spacing means between the anode and cathode, supplementing the spacing provided by barrier disc 12. So far the construction of this primary cell is identical to the cell disclosed and claimed in Ruben Patents 2,422,045 and 2,422,046 to which reference may be made for further details of its construction and assembly.

Against the edge 15 of the zinc foil projecting at the top of the anode assembly 13 is pressed a top disc or cover plate 16 of conductive metal, having an annular bead 19 formed in the circumferential portions thereof. This top disc may be of amalgamated zinc. It is preferred, however, to form this element of another metal having, when amalgamated, a low contact potential with respect to zinc, such as copper or silver, or alloys of copper or silver, as disclosed in the co-pending application of Samuel Ruben, Serial No. 682,734, filed July 11, 1946. Particularly good results are obtained with top plates of amalgamated commercial bronze, which is an alloy of 90% copper and 10% zinc.

Top disc 16 is insulated from the container 10 but sealed against the shoulder 17 thereof by a grommet 18 of suitable insulating material, such as chloroprene rubber, placed around the beaded circumferential portions 19 thereof. The top disc has a depressed central portion in contact with the projecting edge of the zinc foil anode with which it readily forms an amalgam bond. The elements of the entire assembly are held in their relative positions and under pressure contact by means of a turned over edge 20 of the container 10.

The terminal construction comprises a terminal member 21 formed of flexible sheet metal, such as tinned soft copper having a generally annular body portion 22 and a diagonally extending tab or terminal portion 23 integrally formed therewith, the tab portion being bent upwardly substantially in the axis of the cell so that it is readily accessible for attachment of a conductor thereto by soldering, welding or similar operations. The annular or body portion of the terminal member is clinched underneath bead 19 of the top disc 16 so that it is firmly held therein in permanent mechanical and electrical connection therewith.

The method of securing the terminal member to the top disc will be seen best in Figs. 3 and 4, illustrating the said elements prior to their assembly. It will be noted that the top disc 16 is provided in the form of a shell having its side wall 25 extending vertically upwards. Into this shell is inserted the terminal member 21 initially having its annular body portion 22 and its tab portion 23 in the same plane. Thereafter, side wall 25 of the top disc shell is bent down inwardly by means of a suitable tool, forming bead 19, the downwardly turned edges of the said wall pressing down the annular portion of the terminal member and mechanically interlocking the top disc with the terminal member. It has been found that this mechanical fastening is greatly superior to soldering in that it can be carried out rapidly and at a low cost and assures positive electrical connection of low resistance under all operating conditions. The top disc, with the terminal member clinched therein may now be introduced into cell container 10 and may be secured therein by means of grommet 18 and the turned down edge 20 of the container 10, as this has been set forth more fully in the foregoing.

It is to be observed that the terminal tab 24 may be retained in its original flat condition, until it is desired to make an electrical connection thereto, when it is bent up into a more accessible position. This has the advantage that the cell terminal or tab is protected from contact with metal objects during further handling of the cell thereby reducing the danger of accidentally short circuiting the cell.

In some cases, particularly when the cell is intended for assembly with a plurality of similar cells into a battery of higher voltage or of higher capacity, it is frequently desirable to provide terminal lugs or tabs which are longer than the diameter of the top disc. Fig. 5 illustrates a terminal member of modified construction which is satisfactory for such applications. The modified terminal member 21a comprises an annular body portion 22a which is split to define a gap 26. Tab 23a may be of any desired length and has one of its ends integrally formed with the body portion 22a, while its free end or tab portion 23a extends through and beyond gap 26. The assembly of this modified terminal member with the top disc will be obvious without any further description. It may be pointed out, however, that it is necessary to bend up tab 23a into a position substantially vertical with respect to the plane of body portion 22a in order to permit carrying out the clinching operation and to avoid the danger of short circuiting the cell during assembly of the top disc terminal member combination with the cell container.

In many cases, a plurality of the cells embodying the terminal construction of the invention are electrically connected to constitute a battery having a higher voltage or a higher capacity than a single cell. This is accomplished by securing corresponding terminals of the several cells together by means of soldering, welding or similar operations.

Figs. 6 and 7 illustrate another modified embodiment of the invention in which the terminal member is in the form of an inverted shallow cup-shaped disc 21b having an annular body portion 22b and a raised contact or button portion 23b. The annular portion of this terminal member is clinched in bead 19b of the top disc in a manner which will be readily understood from the foregoing description. This form of the invention is particularly useful in devices where it is desirable to quickly and conveniently replace an exhausted cell with a new one, such as in hearing aids, portable radio receivers, flashlights, and the like. In devices of the described character electrical connection is made by means of contact springs engaging cell container 10 and button 23b, respectively.

Although the present invention has been disclosed in connection with a few preferred embodiments thereof, variations and modifications may be resorted to by those skilled in the art without departing from the principles of the invention. Thus, while the cell illustrated in Fig. 2 of the drawing is an alkaline dry cell of the so-called "wound anode" type described in the above mentioned patent, the principles of the invention may be applied with equal or similar results to cells of a great variety of form, shape and internal organization. For example, the terminal construction of the invention provides excellent results in alkaline dry cells of the type having a compressed zinc powder anode, such as are disclosed in the aforesaid Ruben Patent No. 2,422,045. I consider all of these variations and modifications within the true spirit and scope of the present invention, as disclosed in the foregoing description and defined by the appended claims.

What is claimed is:

1. A terminal construction for primary cells which comprises, in combination, a metal plate forming an end of the cell enclosure and having an electrical potential substantially identical with that of one of the cell electrodes, and a terminal member with an outer circumferential portion for said cell, said plate and said terminal member having respective outer circumferential portions thereof mechanically mutually interlocking each other to maintain them in electrically contacting relation.

2. A terminal construction for primary cells, and the like, which comprises, in combination, a generally circular and imperforate metal cover plate forming part of the cell enclosure and in electrical connection with one of the cell electrodes, and a terminal member for said cell having a body portion circumferentially engaged and locked by outer circumferential portions of said cover plate and having a terminal portion integrally formed with said body portion.

3. A terminal construction for primary cells which comprises, in combination, a generally dish-shaped metal top disc forming an end of the cell enclosure and electrically connected to one of the cell electrodes, and a terminal member for said cell including a substantially annular body portion and a terminal portion integrally formed therewith, the annular portion of said terminal member being locked to said top disc by crimped outer marginal portions of the disc.

4. A terminal construction for primary cells which comprises, in combination, a dished metal top disc forming an end of the cell enclosure and in electrical contact with one of the cell electrodes, and a terminal member of flexible sheet metal for said cell including a substantially annular body portion and a terminal lug portion integrally formed with said portion, the annular portion of said terminal member being locked to said top disc by crimped outer marginal portions of the disc and the lug portion of said terminal member being adapted to be bent away from said disc for convenient attachment to an electrical conductor.

5. A terminal construction for primary cells which comprises, in combination, a metal cover plate forming an end of the cell enclosure and having its inner surface in electrical contact with one of the cell electrodes, and a terminal member of flexible sheet metal for said cell including an annular body portion and a diagonally extending lug portion integrally formed with said body portion, the outer marginal regions of said cover plate being clinched over the annular portion of said terminal member to form a strong mechanical bond of low electrical resistance therewith, and the lug portion of said member being initially in the plane of said annular portion and being adapted to be bent away therefrom for convenient attachment of an electrical conductor to said lug portion.

6. A terminal construction for primary cells which comprises, in combination, a metal cover plate forming an end of the cell enclosure and having its inner surface in electrical contact with one of the cell electrodes, and a terminal member of flexible sheet metal for said cell including a generally annular body portion having a gap formed therein and a lug portion having one of its ends integrally formed with said annular portion and having its other free end diagonally extending through and beyond said gap and disconnected from said annular portion, the marginal regions of said cover plate being clinched over the annular portion of said terminal member to form a strong mechanical bond of low electrical resistance therewith and the free end of the lug portion of said member being bent away from the said annular portion for convenient attachment of an electrical conductor.

7. A terminal construction for primary cells which comprises, in combination, a metal cover plate forming an end of the cell enclosure and having its inner surface in electrical contact with one of the cell electrodes, and a circular terminal plate having a raised center contact button portion, the marginal regions of said cover plate being clinched over the corresponding portions of said terminal plate to form a strong mechanical bond of low electrical resistance therewith.

8. In a sealed primary cell of the class comprising a metal can in internal surface contact with one of the cell electrodes, a metal cover plate in internal surface contact with the other of the cell electrodes, and an insulative gasket compressed between cooperating marginal regions of said can and plate constituting therewith an airtight enclosure for the cell, the combination with said cover plate of a terminal member having a body portion mechanically locked between crimped outer portions of said cover plate, and a terminal portion integrally formed with said body portion and exposed for making an electrical connection thereto.

9. A sealed primary cell comprising, in combination, an open ended metal can, a metal cover plate for said can, a terminal member having its circumferential portions locked to corresponding portions of the cover plate by an annular bead of said cover plate and having an externally exposed terminal portion, an insulative gasket compressed between said annular bead and the crimped mouth portions of the can constituting with said can and said cover plate a generally fluid-tight enclosure for the cell, cell electrodes of opposite polarity within said enclosure in respective electrical contact with said can and said cover plate, and an electrolyte interposed between and in contact with said electrodes.

MAURICE FRIEDMAN.

REFERENCES CITED

The following references are of record in the file of this patent:

UNITED STATES PATENTS

| Number | Name | Date |
|---|---|---|
| 1,492,297 | Hipwell | Apr. 29, 1924 |
| 2,000,510 | Corigliano | May 7, 1935 |
| 2,113,405 | Junken | Apr. 5, 1938 |
| 2,422,046 | Ruben | June 10, 1947 |
| 2,447,493 | Daniel | Aug. 24, 1948 |